United States Patent
Kikuchi

(10) Patent No.: US 10,231,155 B2
(45) Date of Patent: Mar. 12, 2019

(54) RADIO BASE STATION, MOBILE COMMUNICATION SYSTEM, HANDOVER CONTROL METHOD, AND PROGRAM

(71) Applicant: NEC CORPORATION, Tokyo (JP)

(72) Inventor: Tsuneyuki Kikuchi, Tokyo (JP)

(73) Assignee: NEC CORPORATION, Minato-Ku, Tokyo (JP)

( * ) Notice: Subject to any disclaimer, the term of this patent is extended or adjusted under 35 U.S.C. 154(b) by 479 days.

(21) Appl. No.: 14/408,658

(22) PCT Filed: Jun. 25, 2013

(86) PCT No.: PCT/JP2013/067376
§ 371 (c)(1),
(2) Date: Dec. 17, 2014

(87) PCT Pub. No.: WO2014/013846
PCT Pub. Date: Jan. 23, 2014

(65) Prior Publication Data
US 2015/0156686 A1  Jun. 4, 2015

(30) Foreign Application Priority Data

Jul. 18, 2012 (JP) ................................ 2012-159637

(51) Int. Cl.
*H04W 36/00* (2009.01)
*H04W 36/08* (2009.01)
(Continued)

(52) U.S. Cl.
CPC ....... *H04W 36/0072* (2013.01); *H04W 12/06* (2013.01); *H04W 36/0079* (2018.08);
(Continued)

(58) Field of Classification Search
CPC . H04W 12/06; H04W 36/00; H04W 36/0038; H04W 36/0061; H04W 36/0072; H04W 36/08; H04W 88/08
(Continued)

(56) References Cited

U.S. PATENT DOCUMENTS 8,570,981 B2 * 10/2013 Aziz .................. H04W 36/245
370/332
2004/0248556 A1 * 12/2004 Rickhoff ............ G07C 9/00857
455/411
(Continued)

FOREIGN PATENT DOCUMENTS

EP     2348771       7/2011
JP     2008-005074   1/2008
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11) 11," 3GPP Standard; 3GPP TS 36.331, 3rd Generation Partnership Project (3GPP), Mobile Competence Centre ; vol. RAN WG2, No. VII.0.0, Jul. 2, 2012, pp. 1-302.
(Continued)

*Primary Examiner* — Joseph Arevalo
(74) *Attorney, Agent, or Firm* — Sughrue Mion, PLLC

(57) ABSTRACT

A radio base station that performs radio communication with a mobile station in a cell and that includes: resource management unit that secures resources necessary for radio communication with the mobile station; and communication control unit that, in accordance with a reconnection request from the mobile station, uses the resources secured by the resource management unit to perform reconnection control for establishing radio communication with the mobile station. If a reconnection request is received from the mobile
(Continued)

station that takes another radio base station as the connection source in a state in which resources have not been secured by resource management unit, communication control unit interrupts the reconnection control, executes handover with the other base station in order to switch the connection destination of the mobile station from the other base station to its own base station, causes resource management unit to secure resources, and then resumes the reconnection control.

8 Claims, 7 Drawing Sheets

(51) Int. Cl.
  *H04W 12/06* (2009.01)
  *H04W 88/08* (2009.01)
(52) U.S. Cl.
  CPC ........ *H04W 36/08* (2013.01); *H04W 36/0038* (2013.01); *H04W 36/0061* (2013.01); *H04W 88/08* (2013.01)
(58) Field of Classification Search
  USPC .... 455/437, 411, 414.1, 410, 436, 439, 518, 455/552.1, 41.2, 432.1, 550.1, 561
  See application file for complete search history.

(56) References Cited

U.S. PATENT DOCUMENTS

| | | | | |
|---|---|---|---|---|
| 2005/0218977 A1* | 10/2005 | Brabetz | ................ | H03F 3/2176 330/10 |
| 2006/0148501 A1* | 7/2006 | Aubauer | ................ | G10L 17/22 455/518 |
| 2006/0194609 A1* | 8/2006 | Matsuo | ............... | H04M 1/6066 455/552.1 |
| 2008/0198809 A1* | 8/2008 | Kim | ...................... | H04W 12/06 370/331 |
| 2009/0061878 A1* | 3/2009 | Fischer | ................ | G08C 17/02 455/436 |
| 2010/0027507 A1* | 2/2010 | Li | ..................... | H04W 36/0055 370/331 |
| 2010/0167744 A1* | 7/2010 | Grob-Lipski | ..... | H04W 36/0088 455/436 |
| 2010/0330994 A1* | 12/2010 | Matsuo | ................ | H04J 11/0069 455/436 |
| 2011/0250892 A1 | 10/2011 | Gupta et al. | | |
| 2012/0051300 A1* | 3/2012 | Cho | ...................... | H04W 72/02 370/329 |
| 2014/0313907 A1* | 10/2014 | Wang | ................... | H04W 24/02 370/242 |
| 2015/0195762 A1* | 7/2015 | Watanabe | ......... | H04W 36/0083 455/436 |
| 2018/0139674 A1* | 5/2018 | Matsuo | ................ | H04W 36/04 |

FOREIGN PATENT DOCUMENTS

| | | |
|---|---|---|
| JP | 2008118227 A | 5/2008 |
| JP | 2010-028816 | 2/2010 |
| JP | 2010-199632 | 9/2010 |
| JP | 2011-009798 A | 1/2011 |
| JP | 2012114705 A | 6/2012 |
| WO | 2009-084998 | 7/2009 |
| WO | WO 2009/142054 | 11/2009 |
| WO | WO 2010/044183 | 4/2010 |
| WO | 2010071126 A1 | 6/2010 |

OTHER PUBLICATIONS

Extended European search report, dated Jul. 23, 2015; Application No. 13820141.3.
International Search Report, PCT/JP2013/067376, dated Jul. 30, 2013.
Communication dated Mar. 28, 2017, from the Japanese Patent Office in counterpart application No. 2015-216598.
Qualcomm Europe, "Access Stratum Based Solution to Connection Recovery after RLF", Discussion and Decision, 3GPP TSG RAN WG2 #66, May 4-8, 2009, R2-093242 (6 pages total).
Communication dated Aug. 16, 2016, from the Japanese Patent Office in counterpart Japanese application No. 2015-216598.
Communication dated Jul. 10, 2018, from the Japanese Patent Office in counterpart application No. 2017-225512.

* cited by examiner

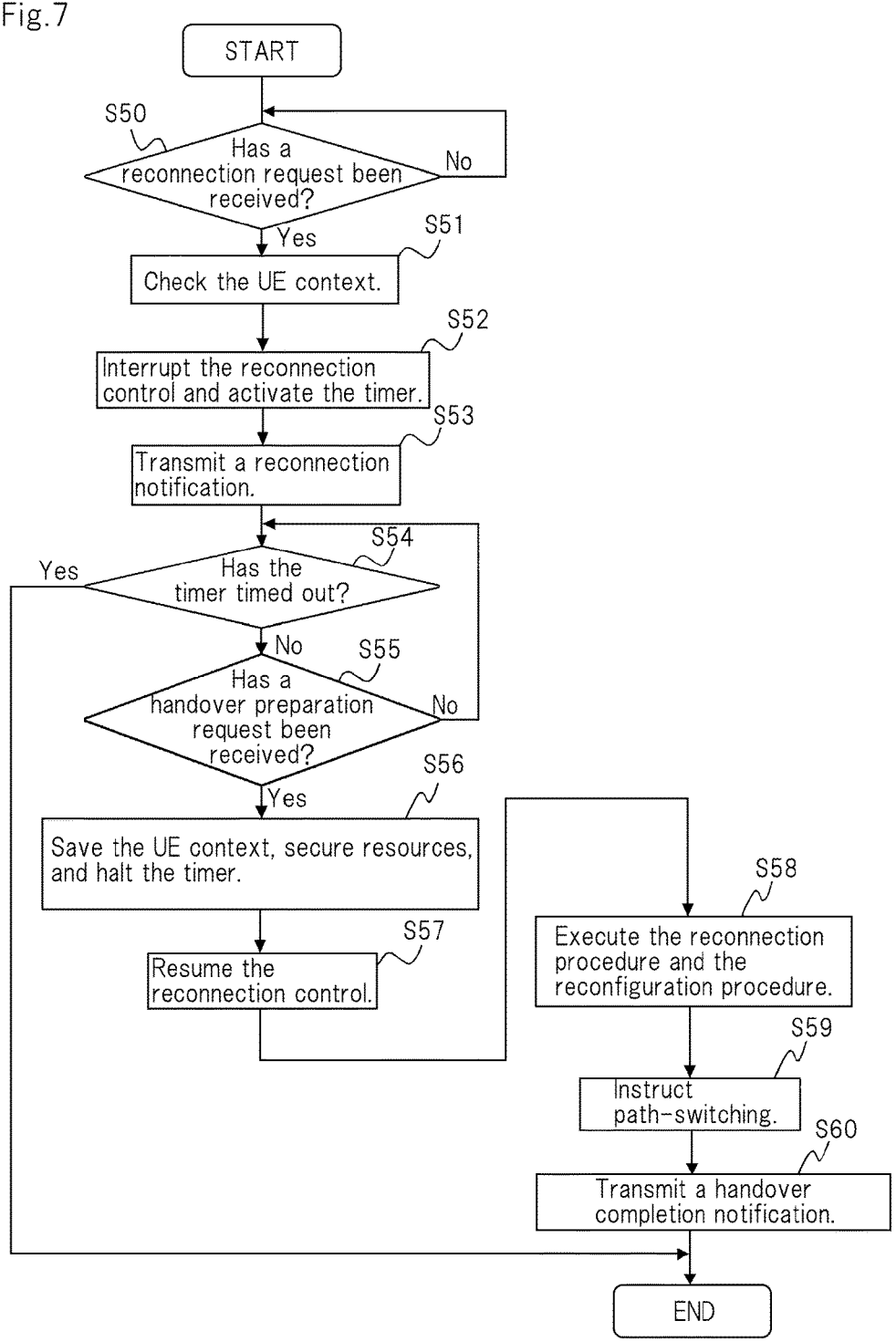

Fig.8

| INFORMATION ELEMENTS | EXPLANATION |
|---|---|
| Message Type | Identifier indicating reconnection notification |
| Failure Cell Identity | Identifier of cell that is up for reconnection |
| UE Identity | UE Identifier of cell that is up for reconnection |
| Authentication Code | Authentication code of UE |
| Re-establishment Cell Identity | Identifier of cell that has received a reconnection request |
| ... | ... |

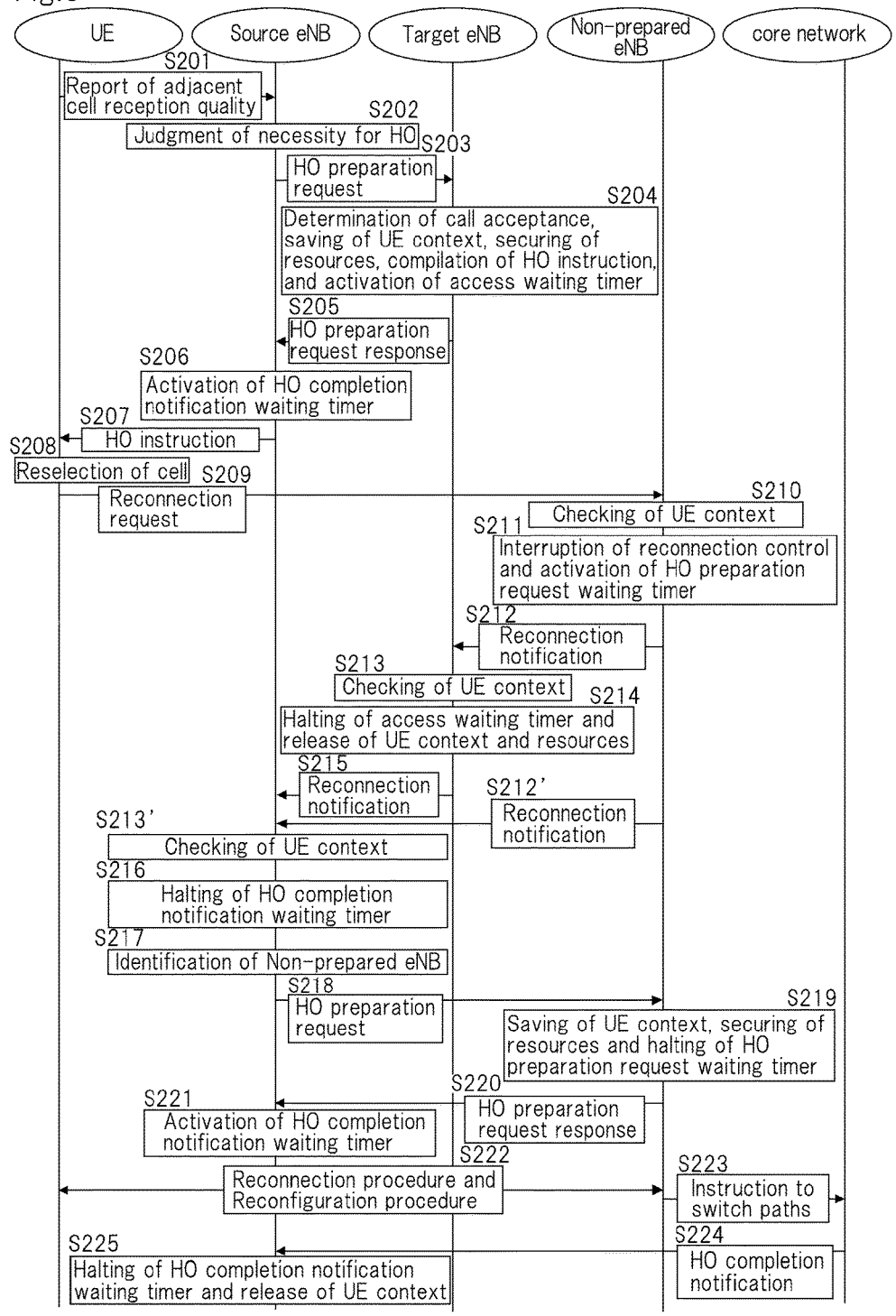

RADIO BASE STATION, MOBILE COMMUNICATION SYSTEM, HANDOVER CONTROL METHOD, AND PROGRAM

TECHNICAL FIELD

The present invention relates to the technology of handover of a mobile communication system.

BACKGROUND ART

As disclosed in 3GPP TS 36.300, in an LTE (Long Term Evolution) mobile communication system, in order to realize mobility of a user while maintaining the communication quality of a mobile station (UE), the UE can be handed over from the original radio base station to a radio base station having a stronger received signal level.

When handover fails for some reason or when a problem occurs in the radio link during communication, communication can be recovered by carrying out reconnection control of the RRC (Radio Resource Control) connection between the UE and the radio base station.

In an LTE system, handover is arranged by the following procedures. First, a handover request is transmitted from the handover source radio base station (Source eNB) to the handover destination radio base station (Target eNB), and the Target eNB that has received the handover request judges whether the UE is able to obtain access based on access control rules such as service authorization and load. When it is determined that the UE is able to obtain access, the Target eNB then secures resources for the UE and returns to the Source eNB a signal indicating that the handover request will be accepted.

Handover is realized by means of the above-described arrangements. If handover fails for some reason, service can be continued by re-connecting the RRC connection and again attempting handover.

On the other hand, in order that reconnection control of the RRC connection may succeed, context information of the UE that includes a cell identifier that identifies the cell in which communication was realized up to this point, a UE identifier that uniquely identifies the UE in that cell, and an authentication code must be saved beforehand in the radio base station in which reconnection is performed. During the above-described handover preparation procedure, reconnection control can be implemented by transmitting the UE context information to the Target eNB.

In the above-described LTE system, techniques have been proposed for raising the success rate of handover or reconnection following handover failure.

For example, in Patent Document 1, the radio base station of the origin of movement selects a plurality of cells having good communication quality on the basis of communication quality reports of neighboring cells from the UE and implements a handover preparation procedure with respect to the plurality of radio base stations that manage these cells. The radio base station of the origin of movement then transmits information of the plurality of radio base stations that have completed the handover preparation to the UE.

The UE selects the movement destination cell that performs handover based on information of the radio base stations that have completed the handover preparation from the radio base station of the origin of movement and the communication quality of the neighboring cells at the time of receiving the information.

Literature of the Prior Art Patent Documents
Patent Document 1: WO2009/142054

SUMMARY OF THE INVENTION

In the method described in Patent Document 1, when there is a radio base station having higher reception quality than the radio base stations that have been set as candidates of handover destination, the UE transmits a reconnection request to that radio base station. When the radio base station receives the reconnection request in a state in which the radio resources, that are necessary for radio communication with the UE, have not been secured, the radio base station transmits a response to the UE indicating that reconnection cannot be carried out. As a result, the UE is unable to reconnect and is unable to receive the communication service. Reconnection thus fails in some cases.

It is therefore an object of the present invention to provide a radio base station, a mobile communication system, a handover control method, and a program that can raise the success rate of reconnection at the time of implementing handover and thus solve the above-described problem.

According to one aspect of the present invention for achieving the above-described object, a radio base station is provided that is provided with a cell for which an area, in which radio communication is possible, is prescribed and that carries out radio communication with a mobile station within that cell, the radio base station including:

a radio resource management unit that secures resources necessary for radio communication with the mobile station; and a communication control unit that, in accordance with a reconnection request from the mobile station that has executed handover for switching a connection destination, uses the resources that were secured by the radio resource management unit to carry out reconnection control to establish radio communication with the mobile station;

wherein the communication control unit, when the reconnection request is received from a mobile station that takes another radio base station as the connection source in a state in which the resources have not been secured by the radio resource management unit, interrupts the reconnection control, executes handover with the other radio base station in order to switch the connection destination of the mobile station to its own base station to cause the radio resource management unit to secure the resources, and then resumes the reconnection control.

According to another aspect of the present invention, a mobile communication system is provided that includes:

a mobile station; and a plurality of radio base stations that are each provided with a cell for which an area, in which radio communication is possible, is prescribed and that each perform radio communication with the mobile station within the cell;

wherein each of the plurality of radio base stations includes:

a radio resource management unit that secures resources necessary for radio communication with the mobile station; and a communication control unit that, in accordance with a reconnection request from the mobile station that has executed handover for switching the connection destination, uses the resources that have been secured by the radio resource management unit to perform reconnection control to establish radio communication with the mobile station; and the communication control unit, upon receiving the reconnection request from the mobile station that takes another radio base station as the connection source in a state in which the resources have not been secured by the radio resource management unit, interrupts the reconnection control, executes handover with the other radio base station in order to switch the connection destination of the mobile station to its own base station to cause the radio resource management unit to secure the resources, and then resumes the reconnection control.

According to yet another aspect of the present invention, a handover control method is provided in which a radio base station that is provided with a cell for which an area in which radio communication is possible is prescribed and that performs radio communication with a mobile station in the cell:

secures resources that are necessary for radio communication with the mobile station, and in accordance with a reconnection request from the mobile station that has executed handover for switching the connection destination, uses the resources that were secured to perform reconnection control to establish radio communication with the mobile station; and when the reconnection request is received from the mobile station that takes another radio base station as the connection source in a state in which the resources have not been secured, interrupts the reconnection control, executes handover with the other radio base station in order to switch the connection destination of the mobile station to its own base station, and after securing the resources, resumes the reconnection control.

According to another aspect of the present invention, a program is provided for causing a computer of a radio base station that is provided with a cell for which an area, in which radio communication is possible, is prescribed and that performs radio communication with a mobile station within the cell to execute processes of:

securing resources necessary for radio communication with the mobile station, and, in accordance with a reconnection request from the mobile station that has executed handover for switching the connection destination, uses the resources that were secured to perform reconnection control to establish radio communication with the mobile station; and when the reconnection request is received from the mobile station that takes another radio base station as the connection source in a state in which the resources have not been secured, interrupting the reconnection control, executing handover with the other radio base station in order to switch the connection destination of the mobile station to its own base station, and after having secured the resources, resuming the reconnection control.

BRIEF DESCRIPTION OF THE DRAWINGS

FIG. 7 is a flow chart showing the procedure of, from among operations that accompany handover of the radio base station shown in FIG. 3, operations of the reconnection request destination.

FIG. 8 is a view for describing an example of reconnection notification.

FIG. 9 is a view for describing the series of mobile communication processes that accompany handover when, from among the mobile station, the radio base station that is the handover source, the radio base station that is the handover destination, and a radio base station other than the handover source/destination of the mobile communication system shown in FIG. 1, a radio base station other than the handover source/destination receives a reconnection request.

Figure 1:
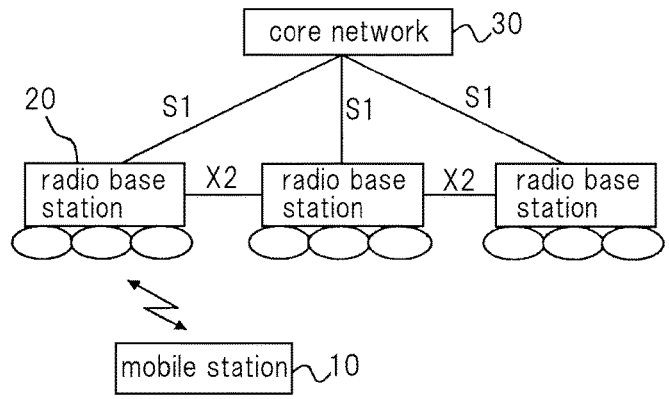
FIG. 1 is a block diagram showing the configuration of the mobile communication system that is an exemplary embodiment of the present invention.

EXPLANATION OF REFERENCE NUMBERS 10 mobile station
11, 21 control unit
12, 22 handover control unit
13, 23 communication unit
14, 24 memory
20 radio base station
30 core network
221 resource management unit
222 communication control unit
231 radio communication unit
232 S1 interface unit
233 X2 interface unit

BEST MODE FOR CARRYING OUT THE INVENTION

An exemplary embodiment of the present invention is next described with reference to the accompanying drawings.

FIG. 1 is a block diagram showing the configuration of the mobile communication system that is an exemplary embodiment of the present invention.

The mobile communication system shown in FIG. 1 is a mobile communication system that adopts the LTE mode described in 3GPP TS 36.300 and includes: mobile station 10, a plurality of radio base stations 20 that are each equipped with a cell, and that perform radio communication with mobile station 10 in the cell, and core network 30.

Core network 30 is provided with S-GW (Serving Gateway) that performs routing of user packets and buffering processes and an MME (Mobility Management Entity) that performs authentication control of a higher-order level. Each radio base station 20 and S-GW/MME are connected by S1 links. Radio base stations 20 are interconnected by X2 links.

The transmission and reception of information between radio base stations 20 is carried out by using S1 links, X2 links, or both types of links.

In the example shown in FIG. 1, there is one mobile station 10 and three radio base stations 20, but the present invention is not limited to these numbers. An actual mobile communication system is made up of a plurality of mobile stations 10 and a plurality of radio base stations 20.

Figure 2:
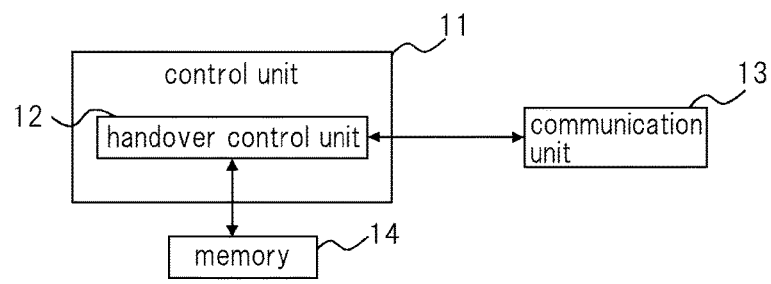
FIG. 2 is a block diagram showing the configuration of the principal parts of a mobile station of the mobile communication system shown in FIG. 1.

FIG. 2 is a block diagram showing the configuration of the principal parts of mobile station 10.

Referring to FIG. 2, the principal parts of mobile station 10 include control unit 11, communication unit 13, and memory 14.

Within a cell, communication unit 13 carries out radio communication with radio base station 20 that manages the cell. In the vicinity of the border of the cell, communication unit 13 both receives radio signals from radio base station 20, that manages the cell in which communication is currently carried out, and receives radio signals from other radio base stations 20 that manage adjacent cells.

Control unit 11 is made up of a CPU (Central Processing Unit) and controls the operations of mobile station 10. Control unit 11 includes handover control unit 12 that performs processing that is necessary for handover.

When carrying out handover, handover control unit 12 acquires reporting conditions from radio base station 20 that is the handover source that manages the cell currently engaged in communication and saves this information. Here, reporting conditions include conditions for judging whether there are adjacent cells in which the reception quality is higher than the cell of the handover source, the difference being equal to or greater than a threshold value, and if there is more than one adjacent cell that satisfy the judgment conditions, then the information of these adjacent cells is reported.

For example, when handover control unit 12 measures the reception quality of radio signals that are received in communication unit 13 at each fixed time interval and when there is an adjacent cell that satisfies the reporting conditions, handover control unit 12 then transmits to radio base station 20, that is the handover source, a list that includes identification information of the adjacent cell and the measurement result of the reception quality.

Handover control unit 12 further receives handover instructions from radio base station 20 that is the handover source by way of communication unit 13, and when handover to a radio base station that is the handover destination fails due to the deterioration of radio quality or due to failure of random access to the radio base station that is the handover destination, measures the reception quality and selects the cell which has the highest reception quality.

Handover control unit 12 further transmits a reconnection request to radio base station 20 that is managing the cell that was selected during cell reselection and performs the reconnection procedure and reconfiguration procedure with this radio base station 20.

A reconnection request contains a cell identifier of the cell of the radio base station that is the connection source of mobile station 10 (the cell that is up for reconnection), a mobile station identifier that uniquely identifies mobile station 10 that is in that cell, and the authentication code of mobile station 10.

Here, the cell that has entered a state requiring reconnection is the handover source cell or the handover destination cell. The handover source cell or handover destination cell is designated depending on the degree of progress of handover when reconnection became necessary.

For example, if handover has not been completed and the connection destination of mobile station 10 is the handover source radio base station, the handover source cell is designated as the cell that has entered a state requiring reconnection. On the other hand, if handover is substantially completed and the connection destination of mobile station 10 is the radio base station that is the handover destination, the cell that is the handover destination is designated as the cell that has entered a state requiring reconnection.

Memory 14 is a storage means which is representative of semiconductor memory and in which programs or data that are needed for operating mobile station 10 are stored. For example, programs or data that are needed to execute processing necessary for carrying out handover are stored in memory 14, and the functions of, for instance, handover control unit 12 can be provided by a CPU that executes programs that are stored in memory 14.

Figure 3:
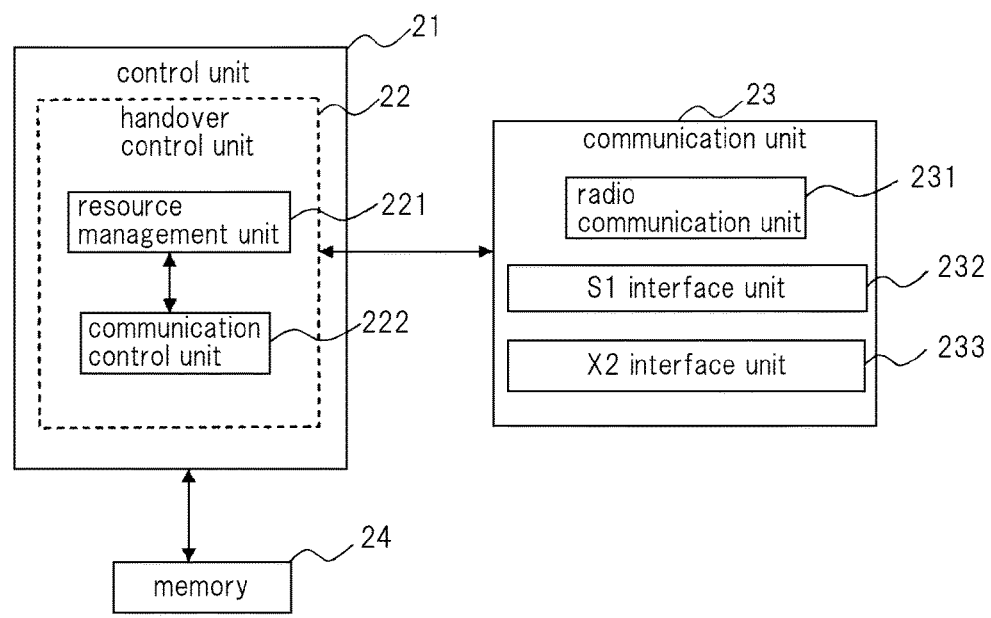
FIG. 3 is a block diagram showing the configuration of the principal parts of the radio base station of the mobile communication system shown in FIG. 3.

FIG. 3 is a block diagram showing the configuration of the principal parts of radio base station 20.

Referring to FIG. 3, the principal parts of radio base station 20 include control unit 21, communication unit 23, and memory 24.

Communication unit 23 includes radio communication unit 231, S1 interface unit 232, and X2 interface unit 233.

Radio communication unit 231 performs radio communication with mobile station 10 that is in the cell of its own station. S1 interface unit 232 communicates with S-GW/MME by way of S1 links. X2 interface unit 233 communicates with other radio base stations by way of X2 links.

Control unit 21 is made up of a CPU and includes handover control unit 22 that executes processing that is necessary for handover.

Handover control unit 22 includes resource management unit 221 that secures the resources necessary for radio communication with mobile station 10, and communication control unit 222 that, in accordance with reconnection requests from mobile station 10 that has executed handover for switching the connection destination, uses the resources secured by resource management unit 221 to carry out reconnection control for establishing radio communication with mobile station 10.

Communication control unit 222, upon receiving a reconnection request from mobile station 10 that takes another radio base station as the connection source in a state in which resources of mobile station 10 have not been secured in resource management unit 221, interrupts reconnection control, executes handover with the other radio base station for switching the connection destination of mobile station 10 to its own base station to cause resource management unit 221 to secure resources of mobile station 10, and then resumes reconnection control.

Memory 24 is storage means, concerning which a semiconductor memory is representative, and stores programs and data necessary for operating radio base station 20. For example, programs or data that are needed to execute processing necessary for carrying out handover are stored in memory 24, and the functions of, for instance, handover control unit 22 can be provided by a CPU that executes programs that are stored in memory 24.

In the above-described radio base station 20, an adjacent base station table, in which base station identifiers that identify the adjacent radio base stations and cell identifiers that identify the adjacent cells that are managed by these adjacent radio base stations are stored in association with each other for each of a plurality of adjacent radio base stations that are adjacent to its own base station, may be stored in memory 24. In this case, communication control unit 222 may receive from mobile station 10 a reconnection request that includes a cell identifier that identifies the cell of the radio base station that is the connection source (the cell that is up for reconnection), a mobile station identifier that uniquely identifies mobile station 10 within that cell, and the authentication code of mobile station 10, acquire from the adjacent base station table the base station identifier that corresponds to the cell identifier of the reconnection request, and transmit to the adjacent radio base station that is identified by the base station identifier a reconnection notification that includes the cell identifier, the mobile station identifier, and the authentication code that are included in the reconnection request.

In addition, upon having received, from a second adjacent radio base station during execution of handover for switching the connection destination of mobile station 10 from a first adjacent radio base station to its own base station, a reconnection notification that includes a cell identifier that identifies the cell (the cell that is up for reconnection) of the radio base station that is the connection source of mobile station 10, the mobile station identifier that uniquely identifies mobile station 10 within the cell, and the authentication code of mobile station 10, communication control unit 222 may both transfer the reconnection notification to the first adjacent radio base station and release the resources that were secured in resource management unit 221.

Further, communication control unit 222, when having received, from a first adjacent radio base station and second adjacent radio base station, a reconnection notification that contains the cell identifier of the cell of the radio base station that is the connection source of mobile station 10 (the cell that is up for reconnection), the mobile station identifier that uniquely identifies mobile station 10 within the cell, and the authentication code of mobile station 10 when executing handover for switching the connection destination of mobile station 10 from its own station to the first adjacent radio base station, may execute handover with the adjacent radio base station from which the reconnection notification was first received for switching the connection destination of mobile station 10 from its own station to the adjacent radio base station.

Further, when communication control unit 222 receives reconnection notification from the first adjacent radio base station after having received reconnection notification from the second adjacent radio base station, communication control unit 222 may instruct the first adjacent radio base station to release the resources of mobile station 10.

The operations of the mobile communication system of the present exemplary embodiment are next described more concretely.

The operations that accompany handover of mobile station 10 are first described.

Figure 4:
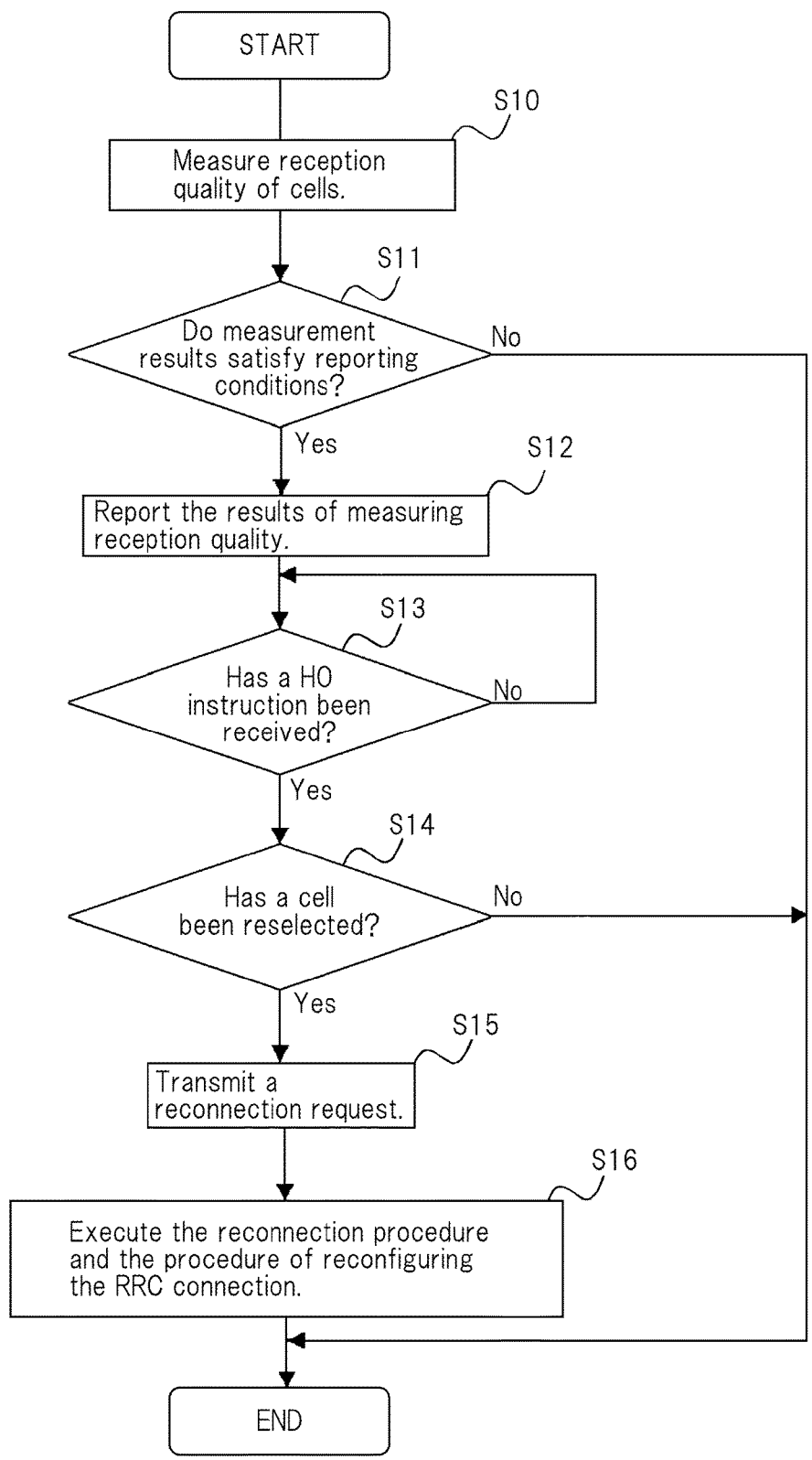
FIG. 4 is a flow chart showing an example of the operations of the handover control unit of the mobile station shown in FIG. 2.

FIG. 4 is a flow chart showing an example of the operations of handover control unit 12 of mobile station 10.

Referring to FIG. 4, handover control unit 12 carries out measurement of reception quality in Step S10. In Step S11, handover control unit 12 judges whether the measurement result of reception quality meets the reporting conditions. If the reporting conditions are not satisfied, the handover process is ended.

If the reporting conditions are satisfied, handover control unit 12 creates a list that contains information of adjacent cells in which reception quality is higher than the cell that is the movement source and in which this difference is equal to or greater than a threshold value and transmits this adjacent cell list to radio base station 20 that is the handover source (Source eNB). The adjacent cell list contains the cell identifiers of the adjacent cells and the base station identifiers of radio base stations 20 that manage the adjacent cells.

In Step S13, handover control unit 12 next judges whether a handover instruction has been received from radio base station 20 that is the handover source (Source eNB).

Next, in Step S14, when a handover instruction is received and the handover to the radio base station that is the handover destination fails (when performing cell reselection) due to the deterioration of reception quality or due to a failure of random access to the radio base station that is the handover destination, handover control unit 12 selects the cell having the highest reception quality.

In Step S15, handover control unit 12 next transmits a reconnection request to radio base station 20 that is managing the adjacent cell that was selected in the cell reselection.

Finally, in Step S16, handover control unit 12 executes a reconnection procedure and a reconfiguration procedure with radio base station 20 that is the reconnection request destination.

The operations that accompany handover of radio base station 20 are next described.

The operations that accompany this handover of radio base station 20 include a first operation as the handover source, a second operation as the handover destination, and a third operation as the reconnection request destination.

Figure 5:
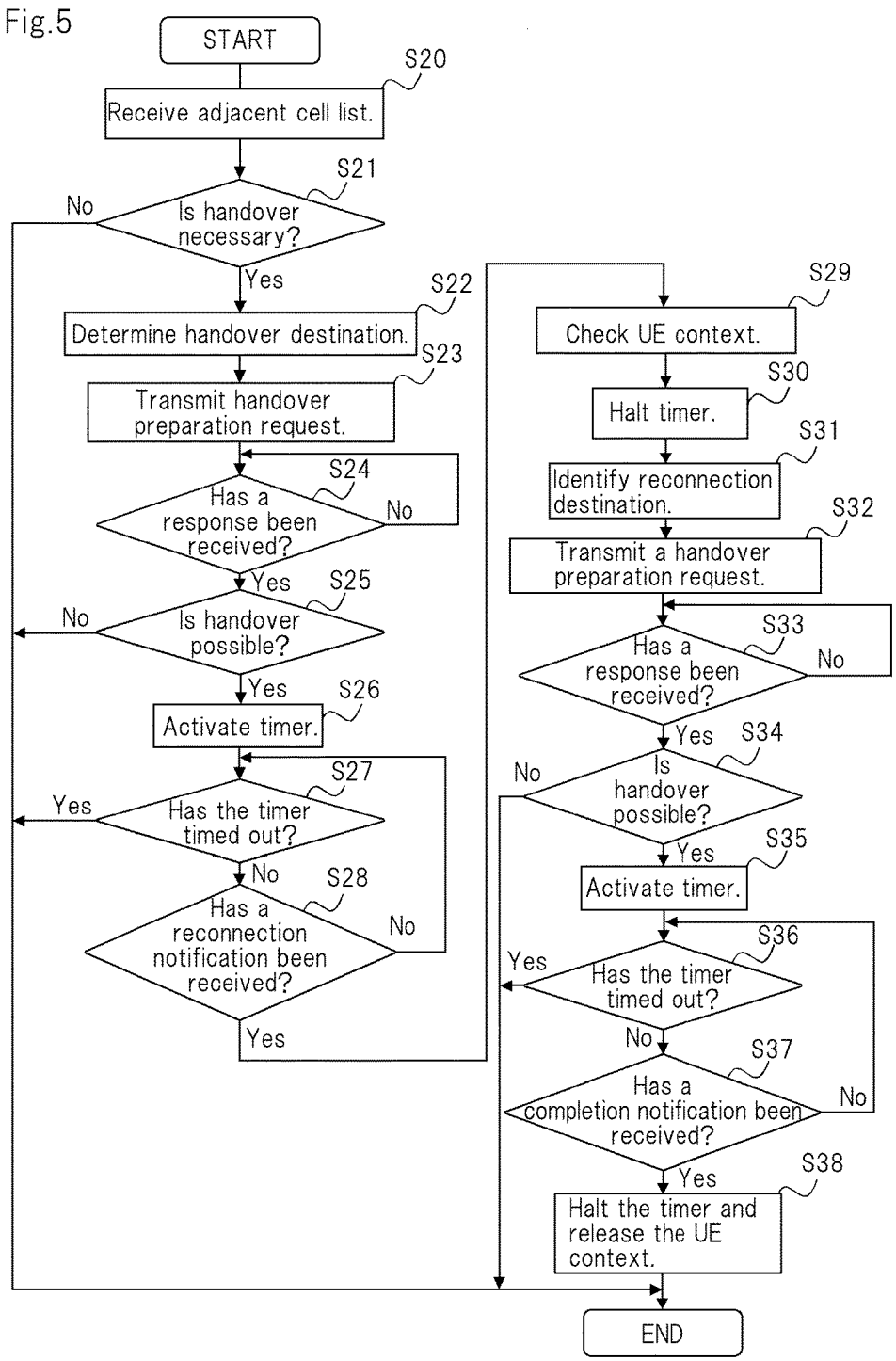
FIG. 5 is a flow chart showing the procedure of, from among the operations that accompany handover of the radio base station shown in FIG. 3, operations of the handover source.

FIG. 5 is a flow chart showing the procedure of the first operation as the handover source.

Referring to FIG. 5, in Step S20, communication control unit 222 receives a communication quality report that includes an adjacent cell list from mobile station 10 by way of radio communication unit 231.

In Step S21, communication control unit 222 judges whether handover is necessary based on, for example, the adjacent cell list. In judging the necessity of handover, communication control unit 222 judges the necessity of handover based on conditions of whether access is restricted due to large CPU processing load or based on conditions of whether service is provided to mobile station 10 for each adjacent cell in the adjacent cell list.

In Step S22, communication control unit 222 excludes from the adjacent cell list cells in which access is restricted or cells in which service is not provided to mobile station 10 and determines, from among the remaining cells, the cell having the highest reception quality as the handover destination cell.

In the above-described Step S22, communication control unit 222 checks whether the handover destination cell that was determined is a cell under the jurisdiction of its own base station.

If the cell is not under its own jurisdiction, communication control unit 222 in Step S23 transmits a handover preparation request to the radio base station (Target eNB) that is managing the handover destination cell.

The handover preparation request may contain the context information of mobile station 10, for example, a service identifier for identifying the service being provided to the user by the radio base station that is the handover source, setting information of the radio resources for providing the service, setting information of a security function, a cell identifier of the handover source cell, a mobile station identifier for uniquely identifying mobile station 10 within the cell, and the authentication code of mobile station 10.

The transmission of the handover preparation request is implemented by way of S1 interface unit 232 or X2 interface unit 233. For example, communication control unit 222 may check whether communication has been established between its own base station and the Target eNB by means of an X2 link, and if communication has been established, may transmit the handover preparation request by X2 interface unit 233.

The link used for the transmission of the handover preparation request may be designated in advance. Alternatively, when communication has been established between its own base station and the Target eNB by way of each of an S1 link and an X2 link, communication control unit 222 may preferentially use an X2 link to transmit the handover preparation request.

In Step S24, communication control unit 222 judges whether a response to the handover preparation request has been received by way of S1 interface unit 232 or X2 interface unit 233. This handover preparation request response contains information indicating whether handover is possible and a handover instruction that includes a cell identifier of the handover destination cell and information of the radio resources of mobile station 10.

In Step S25, communication control unit 222 judges whether the handover preparation request response indicates that handover is possible. If handover is not possible, the handover process is ended.

If handover is possible, communication control unit 222 activates an HO completion notification waiting timer and transmits the handover instruction contained in the handover preparation request response to mobile station 10 by means of radio communication unit 231 in Step S26.

If the handover destination cell that was determined is under the jurisdiction of its own base station in the above-described Step S22, handover is executed between the cells of its own base station based on the above-described Steps S23-S26.

In Step S27, communication control unit 222 checks whether or not the HO completion notification waiting timer has timed out. If the timer has timed out, the handover process is ended.

In Step S28, communication control unit 222 judges whether a reconnection notification was received before the HO completion notification waiting timer timed out. The reconnection notification includes the cell identifier of the cell (the cell that is up for reconnection) of the connection source radio base station, the mobile station identifier of the mobile station in the cell, the authentication code of the mobile station, and the cell identifier of the cell (the reconnection request destination cell) of the radio base station that received the reconnection request.

If a reconnection notification has been received, communication control unit 222 checks the UE context in Step S29. More specifically, communication control unit 222 checks whether the cell identifier, mobile station identifier, and authentication code contained in the reconnection notification are held in its own base station. If they are not held in its own base station, the radio base station operates as the radio base station of the reconnection request destination (Non-prepared eNB) (refer to the third operation, to be described).

If the information is held, communication control unit 222 halts the HO completion notification waiting timer in Step S30.

In Step S31, communication control unit 222 identifies the radio base station that manages the reconnection request destination cell based on the cell identifier of the reconnection request destination cell that is contained in the reconnection notification. In addition, communication control unit 222 issues a request to the handover destination radio base station to release the radio resources that were secured in the handover preparation procedure.

In Step S32, communication control unit 222 transmits a handover preparation request to the radio base station that was identified by means of S1 interface unit 232 or X2 interface unit 233.

In Step S33, communication control unit 222 judges whether a response to the handover preparation request has been received by way of S1 interface unit 232 or X2 interface unit 233. This handover preparation request response includes information indicating whether handover is possible and a handover instruction that contains the cell identifier of the handover destination cell (in this case, identical to the reconnection request destination) or information of the radio resources of mobile station 10.

In Step S34, communication control unit 222 judges whether the handover preparation request response indicates that handover is possible. If handover is not possible, the handover process is ended.

If handover is possible, communication control unit 222 activates the HO completion notification waiting timer in Step S35.

In Step S36, communication control unit 222 checks whether the HO completion notification waiting timer has timed out. If the timer has timed out, the handover process is ended.

In Step S37, communication control unit 222 judges whether a handover completion notification was received by way of S1 interface unit 232 or X2 interface unit 233 before the HO completion notification waiting timer timed out.

If the handover completion notification has been received, communication control unit 222 halts the HO completion notification waiting timer and releases the UE context in Step S38.

Figure 6:
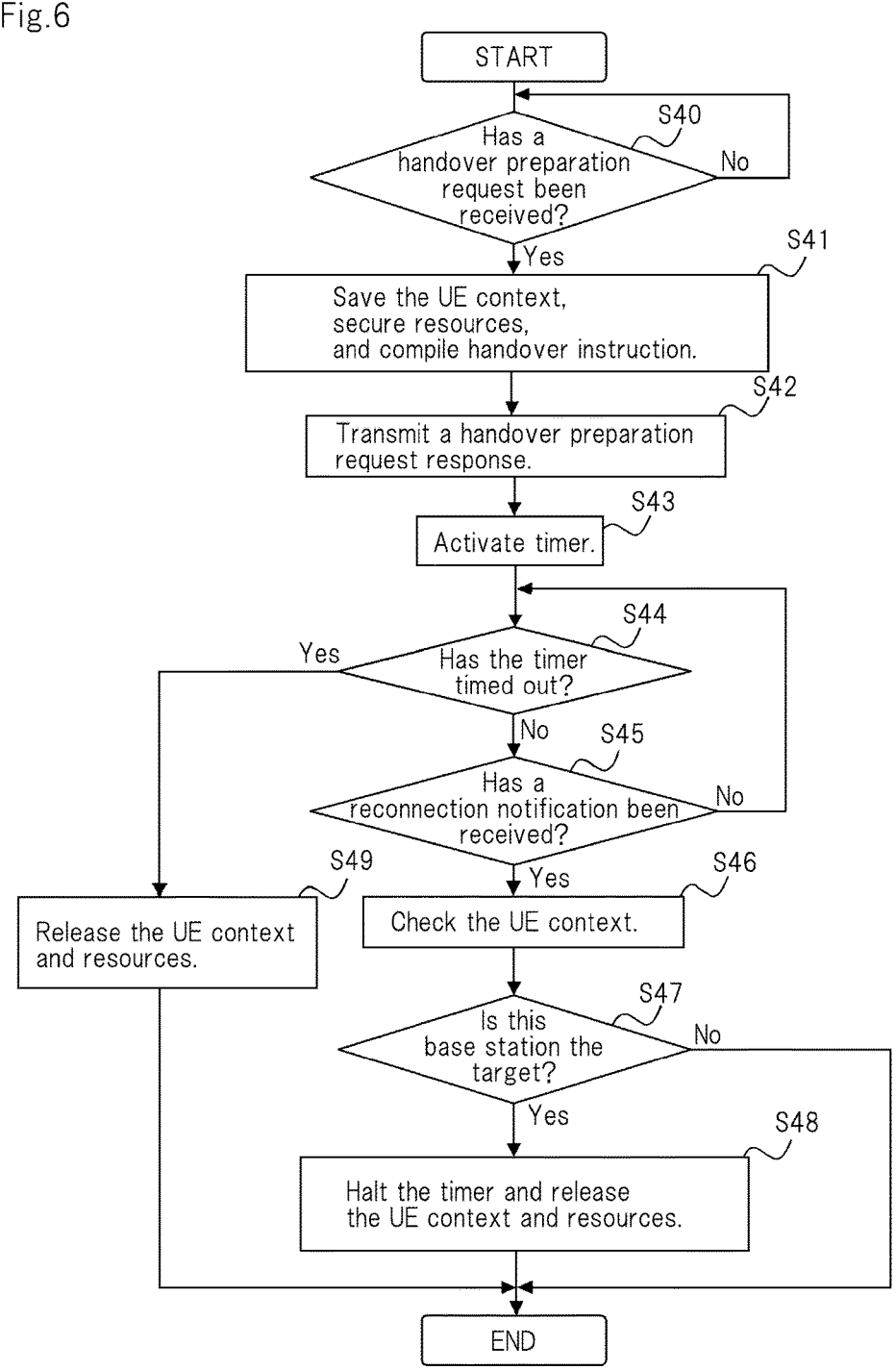
FIG. 6 is a flow chart showing the procedure of, from among the operations that accompany handover of the radio base station shown in FIG. 3, operations of the handover destination.

FIG. 6 is a flow chart showing the procedure of the second operation as the handover destination.

Referring to FIG. 6, in Step S40, communication control unit 222 judges whether a handover preparation request has been received from the handover source radio base station by way of S1 interface unit 232 or X2 interface unit 233.

If a handover preparation request has been received, communication control unit 222 judges whether the handover preparation request can be accepted in Step S41. If the handover preparation request can be accepted, communication control unit 222 saves the context information of mobile station 10 in memory 24, secures the radio resources of its own base station that are necessary for providing service to mobile station 10, and compiles a handover instruction that contains information of the cell identifier of the handover destination cell and the radio resources that are set in mobile station 10.

In Step S42, communication control unit 222 transmits a handover preparation request response, that contains the above-described handover instruction that was compiled, to the handover source radio base station by means of S1 interface unit 232 or X2 interface unit 233. If the handover preparation request cannot be accepted, communication control unit 222 transmits a response indicating that the handover preparation request cannot be accepted to the handover source radio base station.

In Step S43, communication control unit 222 activates waiting timer for access from mobile station 10 that corresponds to the handover request. The timing of the timing-out of this timer is the trigger for releasing the context information that was saved and the radio resources that were secured in Step S41.

In Steps S44 and S45, communication control unit 222 judges whether a reconnection notification is received before the timer times out. Here, the reconnection notification includes a cell identifier of the cell (the cell that is up for reconnection) of the connection source radio base station, the mobile station identifier of the mobile station in the cell, the mobile station authentication code, and the cell identifier of the cell (cell to which reconnection is requested) that received the reconnection request.

When the reconnection notification is received, communication control unit 222 checks the UE context information in Step S46. In Step S47, communication control unit 222 then judges whether its own base station is the handover destination (target). More specifically, communication control unit 222 checks whether the cell identifier, mobile station identifier, and authentication code that are contained in the reconnection notification are held in its own base station, and if held, determines that its own base station is the handover destination (target).

If the cell identifier, mobile station identifier and authentication code that are contained in the reconnection notification are not held in its own base station, the radio base station operates as the radio base station that is a reconnection request destination (Non-prepared eNB) (refer to the third operation described hereinbelow).

If its own base station is the handover destination (target), communication control unit 222 in Step S48 halts the timer and releases context information that was saved and the radio resources that were secured in Step S41.

If the timer has timed out in Step S44 described hereinabove, communication control unit 222 in Step S49 releases the context information that was saved and the radio resources that were secured in Step S41.

FIG. 7 is a flow chart showing the procedure of the third operation as the reconnection request destination.

Referring to FIG. 7, communication control unit 222 in Step S50 judges whether a reconnection request has been received. A reconnection request here includes the cell identifier of the cell (the cell that is up for reconnection) of the connection source radio base station of mobile station 10, the mobile station identifier that uniquely identifies mobile station 10 in the cell, and the authentication code of mobile station 10.

If a reconnection request has been received, communication control unit 222 in Step S51 starts reconnection control in accordance with the reconnection request, and checks the UE context information. More specifically, communication control unit 222 checks whether the cell identifier of the cell (the cell that is up for reconnection) of the connection source radio base station, the mobile station identifier, and authentication code that are contained in the reconnection request have been saved in its own station. If this information has not saved, communication control unit 222 executes the processing of Step S52 and subsequent processes. If the information has been saved, the radio base station operates as a radio base station that is the handover source or handover destination.

In Step S52, communication control unit 222 interrupts the reconnection control and activates the handover preparation request waiting timer.

In Step S53, communication control unit 222 acquires from the adjacent base station table the base station identifier that corresponds to the cell identifier that is contained in the reconnection request and transmits by means of S1 interface unit 232 or X2 interface unit 233 a reconnection notification to the adjacent radio base station that is specified by the base station identifier.

The reconnection notification contains, for example, information elements such as shown in FIG. 8. In the example of FIG. 8, the information elements include: the identifier "Message Type" that indicates a reconnection notification, the cell identifier "Failure Cell Identity" of the cell that is up for reconnection, the UE identifier "UE Identity" of the cell that is up for reconnection, the authentication code "Authentication Code" of the UE, and the cell identifier "Re-establishment Cell Identity" of the cell in which the reconnection request was received.

In Steps S54 and S55, communication control unit 222 judges whether a handover preparation request was received from the handover source radio base station by way of S1 interface unit 232 or X2 interface unit 233 before time-out. If the timer timed out, communication control unit 222 ends the handover process.

If a handover preparation request was received, communication control unit 222 in Step S56 judges whether the handover preparation request can be accepted. If the handover preparation request can be accepted, communication control unit 222 saves the context information of mobile station 10 in memory 24, secures the radio resources of its own station that are necessary for providing service to mobile station 10, and halts the handover preparation request waiting timer. Communication control unit 222 then transmits a response indicating that the handover preparation request has been accepted to the handover source radio base station by way of S1 interface unit 232 or X2 interface unit 233.

In Step S57, communication control unit 222 resumes reconnection control. In Step S58, communication control unit 222 carries out the reconnection procedure and the reconfiguration procedure with the handover source radio base station.

In Step S59, communication control unit 222 transmits a path-switching instruction to core network 30 by way of S1 interface unit 232.

In Step S60, communication control unit 222 transmits a handover completion notification to the handover source radio base station by way of S1 interface unit 232 or X2 interface unit 233.

Next, as the specific operations of the mobile communication system of the present exemplary embodiment, a series of mobile communication processes that accompany handover is described for a case in which, from among a mobile station (UE), a handover source radio base station (Source eNB), a handover destination radio base station (Target eNB), and a radio base station other than the handover source/destination (Non-prepared eNB), the radio base station other than the handover source/destination receives a reconnection request.

FIG. 9 is a view for describing the procedure of such a series of mobile communication processes that accompany handover.

Referring to FIG. 9, in Step S201, the UE measures reception quality of adjacent cells, and when the reporting conditions instructed from the Source eNB that manages the cell in which communication is carried out are satisfied, transmits to the Source eNB the reception quality of the plurality of adjacent cells obtained in the measurement.

In Step S202, the Source eNB judges whether handover needs to be performed. If the current state satisfies the handover trigger conditions, the Source eNB judges that the UE requires handover and executes Step S203. If the current state does not satisfy the handover trigger conditions, the Source eNB ends the mobile communication processing.

In Step S203, the Source eNB determines the cell having the highest reception quality value to be the handover destination cell, and transmits a handover preparation request to the Target eNB that is managing this cell.

In the above-described Step S203, the Source eNB is able to exclude cells in which load is great or to which access is restricted and to exclude cells that are not providing service to the UE and is then able to determine from among the remaining cells the cell having the highest reception quality value as the handover destination cell.

In addition, the Source eNB is able to both check whether the handover destination cell is a cell under the control of its own eNB and whether an X2 interface link has been established with the radio base station that manages the handover destination cell, and further, to determine whether to use the X2 interface or the S1 interface for transmitting the handover preparation request.

Still further, the Source eNB may add context information of the UE (for example, an identifier of service that was offered to the user in the Source eNB, setting information of the radio resources for providing the service, setting information of a security function, the identifier of the handover source cell, a UE identifier for uniquely identifying the UE within the cell, and an authentication code) to the handover preparation request. Thus, in subsequent steps, the Target eNB will be able to determine the required resources of the UE based on this context information and, even following the failure of handover due to some reason and the subsequent implementation of reconnection of the RRC connection, the Target eNB will be able to reattempt handover and continue providing service.

In Step S204, the Target eNB that has received the handover preparation request judges whether the handover preparation request can be accepted.

If the handover preparation request can be accepted, the Target eNB saves the context information of the UE, secures resources of its own eNB that are necessary for providing service to the UE, and compiles a handover instruction that contains the identifier of the handover destination cell and information of the radio resources that are set to the UE. The Target eNB then activates a timer for waiting access from the UE that corresponds to the handover request that serves as the trigger for releasing the context information of the UE and the resources secured for the UE.

In Step S205, the Target eNB transmits to the Source eNB a response indicating acceptance of the handover preparation request and containing the previously compiled handover instruction. If the handover preparation request cannot be accepted, the Target eNB transmits to the Source eNB a response indicating that the handover cannot be accepted.

In Step S206, the Source eNB that has received the handover preparation request response activates a waiting timer for a handover completion notification from the Target eNB that corresponds to the handover request, this notification serving as the trigger for releasing the context information of a UE for which handover has succeeded. If communication data that have been transmitted from the UE are being buffered or if communication data that the UE are to receive are being buffered, the Source eNB can transmit the communication data that are being buffered to the Target eNB. After an RRC connection has been successfully established between the UE and the Target eNB, the communication data are transferred to a higher-order S-GW or are transmitted to the UE by the Target eNB.

In Step S207, the Source eNB transmits the handover instruction that was contained in the handover preparation request response to the UE, and instructs the UE to access the Target eNB.

In Step S208, if the UE encounters a failure in accessing the Target eNB due to, for example, deterioration of the radio quality or a failure of random access to the Target eNB, an appropriate cell is selected to recover the handover as quickly as possible and continue the service being received by the UE.

In Step S209, the UE transmits to the radio base station that manages the selected cell a reconnection request that includes the identifier of the cell that is up for reconnection, the UE identifier for uniquely identifying the UE within the cell, and the authentication code.

In Step S210, the radio base station that has received the reconnection request checks whether the identifier of the cell that is up for reconnection, the UE identifier of the cell, and the authentication code that were contained in the reconnection request have been saved in the handover preparation procedure. If the information has been saved, the radio base station judges that its own station is the Target eNB, halts the access waiting timer, and continues the reconnection procedure, thereby succeeding in recovering from the handover failure.

If the information has not been saved, the radio base station in Step S211 judges that its own base station is a Non-Prepared eNB, and at the point of originally rejecting the reconnection request because the context information of the UE has not been saved, interrupts the reconnection control and identifies the radio base station that manages the cell based on the identifier of the cell that is up for reconnection and the adjacent base station table. The radio base station then activates the handover preparation request waiting timer that serves as the trigger for resuming the interrupted reconnection control.

The adjacent base station table is made up of combinations of the identifiers of cells adjacent to the Non-Prepared eNB and information of the radio base stations that manage the cells. The adjacent base station table may be prepared in advance as station data of the Non-Prepared eNB, or may be produced based on the information of cells that is exchanged among radio base stations by way of X2 links.

After activation of the handover preparation request waiting timer, the Non-Prepared eNB executes Step S212, Step S212', or both steps.

In Step S212, the Non-Prepared eNB transmits a reconnection notification to the Target eNB. In Step S212', the Non-Prepared eNB transmits a reconnection notification to the Source eNB. Here, a reconnection notification is made up of information elements such as shown in FIG. 8.

When transmitting a reconnection notification, the Non-Prepared eNB is able to check whether an X2 link has been established with the radio base station that manages the cell that is up for reconnection (the Source eNB or Target eNB) and to determine whether to use the X2 interface or the S1 interface for transmitting the reconnection notification.

After executing Step S212, in Step S213, the Target eNB that received the reconnection notification checks whether the identifier of the cell that is up for reconnection, the UE identifier of the cell, and the authentication code that are contained in the reconnection notification have been saved.

As a result of the check described above, the Target eNB ignores the reconnection notification that was received if the information has not been saved.

If the above-described check shows that the information has been saved, the Target eNB in Step S214 checks whether the timer for awaiting the access from the reconnecting UE has been activated, and if the timer has been activated, determines that its own base station is operating as the Target eNB, halts the timer, and releases the context information of the UE and the resources that were secured for providing service to the UE. Then, in Step S215, the Target eNB transfers the reconnection notification to the Source eNB.

In Step S213', after the execution of Step S212' or after the execution of Step S215, the Source eNB that received the reconnection notification checks whether the identifier of the cell that is up for reconnection, the UE identifier of that cell, and the authentication code that are contained in the reconnection notification have been saved.

If the above-described check shows that the information has not been saved, the Source eNB ignores the reconnection notification that was received.

If the above-described check shows that the information has been saved, the Source eNB in Step S216 checks whether the handover completion notification waiting timer has been activated, and if the timer has been activated, determines that its own base station was operating as the Source eNB and halts the timer.

In Step S217, after halting the handover completion notification waiting timer, the Source eNB identifies the Non-prepared eNB that manages the cell based on the identifier of the cell that received the reconnection request that is contained in the reconnection notification and the adjacent base station table. When the radio base station that transmitted the reconnection notification is not the Target eNB, the Source eNB instructs the Target eNB to release the resources that were secured for the UE.

In Step S218, the Source eNB transmits a handover preparation request to the Non-prepared eNB. Here, the Source eNB may also append the context information of the UE (for example, the identifier of service that was being provided to the user in the Source eNB, setting information of the radio resources for providing the service, setting information of security functions, the identifier of the handover source cell, the UE identifier for uniquely identifying the UE within the cell, and the authentication code) to the handover preparation request. In this way, the Non-prepared eNB in succeeding steps is able to, based on this context information, determine the necessary resources of the UE or, even in the event that there is a reconnection control failure for some reason, after reconnection of the RRC connection, and re-attempt reconnection control to continue the service.

In Step S219, the Non-prepared eNB that received the handover preparation request saves the context information of the UE, secures the resources of its own eNB that are necessary for providing service to the UE, and halts the handover preparation request waiting timer.

In Step S220, the Non-prepared eNB transmits to the Source eNB a response indicating acceptance of the handover preparation request.

In Step S221, the Source eNB that has received the handover preparation request response activates the waiting timer for the handover completion notification from the Non-prepared eNB that corresponds to the handover request and that serves as the trigger for releasing the context information of the UE for which handover has succeeded.

In the processing of the above-described Step S221, if the communication data that have been transmitted from the UE are being buffered or if the communication data that the UE are to receive are being buffered, the Source eNB is able to transfer communication data that are being buffered to the Non-prepared eNB. After the RRC connection between the UE and the Non-prepared eNB has been successfully reconnected, these communication data are transferred to a higher-order S-GW or transmitted to the UE by the Non-prepared eNB.

In Step S222, the Non-prepared eNB executes a reconnection procedure and a Reconfiguration procedure of the RRC connection with the UE.

In Step S223, the Non-prepared eNB instructs the core network to switch the connection to the UE provided between Source eNB and the core network to the connection between the Non-prepared eNB and core network 30. In Step S224, core network 30 reports the handover completion to the Source eNB.

In Step S225, the Source eNB that has received the handover completion notification halts the handover completion notification waiting timer of the UE and releases the context information of the UE.

The mobile communication system of the present exemplary embodiment described hereinabove exhibits the following action and effects.

In the method described in Patent Document 1, the UE must wait for responses from the plurality of radio base stations that are candidates as handover destinations, resulting in the lengthening of the time required for handover. In addition, because the plurality of radio base stations must secure resources for the same UE, the overall capacity of the system is reduced. Still further, of the radio base stations that are taken as candidates, radio base stations other than the radio base station that is selected by the UE must implement the handover cancel process, thereby increasing the processing load.

The mobile communication system of the present exemplary embodiment eliminates the need for the plurality of radio base stations to implement the handover preparation procedure, whereby the success rate of reconnection at the time of executing handover can be improved.

In addition, the time and processing load required for handover can be reduced, and the pointless securing of resources can be limited.

Still further, when a radio base station has received a reconnection request from a UE and has not secured radio resources of the UE in its own base station, the radio base station, by interrupting reconnection control and implementing handover with the radio base station that manages the cell that is up for reconnection (the Source eNB or the Target eNB), secures the radio resources of the UE and then resumes the reconnection control. In this way, reconnection control can be implemented reliably and the success rate of reconnection when executing handover can be further improved.

The mobile communication system of the present exemplary embodiment described hereinabove is only one example of the present invention, and the configuration is open to various modifications within a scope that will be clear to one of ordinary skill in the art based on the spirit of the present invention.

For example, in the mobile communication processing procedure of FIG. 9, upon being informed that handover cannot be accepted as the handover preparation request response of Step S205, the Source eNB may wait for the next report of reception quality, or may determine, from among the candidates of radio base stations that are capable of handover in the list obtained in the report of Step S201, the radio base station that has the next highest reception quality as the handover destination and execute the process of Step S203. In the former case, the wasteful securing of resources can be limited compared to the latter case.

The program executed by the CPU of radio base station 20 (for example, a program for providing the capabilities of handover control unit 22) may be provided on a recording medium that can be read by a computer, for example, an optical disk such as a CD (Compact Disc) or DVD (Digital Video Disc) or by means of a USB (Universal Serial Bus)

memory or memory card, or may be provided by way of a communication network (for example, the Internet).

Although the present invention has been described with reference to an exemplary embodiment, the present invention is not limited to the above-described exemplary embodiment. The configuration and operations of the present invention are open to various modifications within a scope that does not depart from the spirit of the present invention that will be clear to one of ordinary skill in the art.

This application claims the benefits of priority based on Japanese Patent Application No. 2012-159637 for which application was submitted on Jul. 18, 2012 and incorporates by citation all of the disclosures of that application.

What is claimed is:

1. A mobile communication system comprising:
a source base station;
an initial target base station;
a non-prepared base station, different from the initial target base station; and
a mobile terminal configured to transmit a connection re-establishment request to the non-prepared base station upon failure of a handover of the mobile terminal from the source base station to the initial target base station;
wherein the non-prepared base station is configured to receive the connection re-establishment request from the mobile terminal and, after receipt of the connection re-establishment request, to transmit a message to the source base station; and
the source base station is configured to receive the message from the non-prepared base station and to trigger a handover preparation of the mobile terminal towards the non-prepared base station as a new target base station;
wherein the message from the non-prepared base station to the source base station comprises a first ID indicating the non-prepared base station, a second ID indicating the source base station and a third ID indicating the mobile terminal.

2. The mobile communication system according to claim 1,
wherein, if the source base station matches a context of the mobile terminal, the source base station triggers the handover preparation.

3. A source base station comprising:
a transceiver configured to receive a message from a non-prepared base station; and a controller configured to trigger a handover preparation of a mobile terminal towards the non-prepared base station as a new target base station;
wherein the message is transmitted by the non-prepared base station to the source base station after reception, by the non-prepared base station of a connection re-establishment request from the mobile station upon failure of a handover of the mobile terminal from the source base station to an initial target base station; and
wherein the message from the non-prepared base station comprises a first ID indicating the non-prepared base station, a second ID indicating the source base station and a third ID indicating the mobile terminal.

4. The source base station according to claim 3,
wherein the controller triggers the handover preparation, if the controller matches a context of the mobile terminal.

5. A method realized by a source base station, the method comprising:
receiving a message from a non-prepared base station; and
triggering a handover preparation of a mobile terminal towards the non-prepared base station as a new target base station,
wherein the message is transmitted by the non-prepared base station to the source base station after reception, by the non-prepared base station of a connection re-establishment request from the mobile station upon failure of a handover of the mobile terminal from the source base station to an initial target base station; and
wherein the message from the non-prepared base station comprises a first ID indicating the non-prepared base station, a second ID indicating the source base station and a third ID indicating the mobile terminal.

6. The method according to claim 5,
wherein the controller triggers the handover preparation, if the controller matches a context of the mobile terminal.

7. A mobile terminal comprising:
a controller configured to detect a handover failure of the mobile terminal from a source base station to an initial target base station;
a transceiver configured to transmit a connection re-establishment request to a non-prepared base station;
wherein a message is transmitted, from the non-prepared base station to the source base station after a reception, by the non-prepared base station of the connection re-establishment request,
wherein the controller processes a handover procedure towards the non-prepared base station, as a new target base station, the handover procedure triggered by the source base station, and
wherein the message from the non-prepared base station to the source base station comprises a first ID indicating the non-prepared base station, a second ID indicating the source base station and a third ID indicating the mobile terminal.

8. The mobile terminal according to claim 7,
wherein if the source base station matches a context of the mobile terminal, the source base station triggers the handover preparation.

* * * * *